US008893093B2

(12) United States Patent
Hossain et al.

(10) Patent No.: US 8,893,093 B2
(45) Date of Patent: Nov. 18, 2014

(54) METHOD AND SYSTEM FOR AUTOMATED PERFORMANCE TESTING IN A MULTI-TENANT ENVIRONMENT

(75) Inventors: Fiaz Hossain, San Francisco, CA (US); James Iry, Richmond, CA (US); James Waldrop, Alameda, CA (US); Peter Morelli, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 657 days.

(21) Appl. No.: 13/101,955

(22) Filed: May 5, 2011

(65) Prior Publication Data

US 2012/0136602 A1    May 31, 2012

Related U.S. Application Data

(60) Provisional application No. 61/395,158, filed on May 7, 2010.

(51) Int. Cl.
*G06F 9/44* (2006.01)
*G06F 11/36* (2006.01)

(52) U.S. Cl.
CPC .................. *G06F 11/3616* (2013.01)
USPC ............ 717/131; 717/124; 717/126; 717/127

(58) Field of Classification Search
None
See application file for complete search history.

(56) References Cited

U.S. PATENT DOCUMENTS

| 6,757,893 | B1* | 6/2004 | Haikin | 717/170 |
| 7,152,224 | B1* | 12/2006 | Kaler et al. | 717/121 |
| 7,933,869 | B2* | 4/2011 | Becker et al. | 707/625 |
| 8,286,132 | B2* | 10/2012 | Yuan et al. | 717/120 |
| 8,327,325 | B2* | 12/2012 | Chung et al. | 717/110 |
| 8,407,205 | B2* | 3/2013 | Doshi et al. | 707/710 |
| 8,434,129 | B2* | 4/2013 | Kannappan et al. | 726/3 |
| 8,504,556 | B1* | 8/2013 | Rice et al. | 707/713 |
| 2006/0106889 | A1* | 5/2006 | Mannby | 707/203 |
| 2008/0162491 | A1* | 7/2008 | Becker et al. | 707/10 |
| 2009/0288084 | A1* | 11/2009 | Astete et al. | 718/1 |
| 2009/0300423 | A1* | 12/2009 | Ferris | 714/38 |
| 2010/0180255 | A1* | 7/2010 | Chung et al. | 717/110 |
| 2011/0231708 | A1* | 9/2011 | Lawrance et al. | 714/38.1 |

OTHER PUBLICATIONS

Nagy Mostafa and Chandra Krintz, "Tracking Performance Accross Software Revisions", Aug. 27, 2009, ACM, (whole document).*

* cited by examiner

*Primary Examiner* — Don Wong
*Assistant Examiner* — Roberto E Luna
(74) *Attorney, Agent, or Firm* — Ingrassia Fisher & Lorenz, P.C.

(57) ABSTRACT

In application testing and debugging processes, it is necessary to change, rebuild and test code. Thus, to speed the testing and debugging process, the process of retrieving application change lists, rebuilding the application, executing the application and recording application performance metrics may be automated. Additionally, through the use of environment independent metrics 110, application performance can be better evaluated for a wider range of hypothetical hardware configurations than tradition metrics which are highly dependent on the environment in which the test is running.

12 Claims, 7 Drawing Sheets

METHOD AND SYSTEM FOR AUTOMATED PERFORMANCE TESTING IN A MULTI-TENANT ENVIRONMENT

CLAIM OF PRIORITY

This application claims the benefit of U.S. Provisional Patent Application 61/395,158 entitled METHOD AND SYSTEM FOR AUTOMATED PERFORMANCE TESTING IN A MULTI-TENANT ENVIRONMENT, by Fiaz Hossain et al., filed May 17, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

These inventions relate to the real-time debugging of production applications and servers in a multi-tenant cloud computing infrastructure.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the user sending a query to the database system. The database system might process the request for information received in the query and send to the user system information relevant to the request. The secure efficient retrieval of accurate information and subsequent delivery of this information to the user system has been and continues to be a goal of administrators of database systems.

Database information is accessed through software running on application servers. The software running on application servers is tested before being run in production. The performance of the software is interpreted based on metrics collected during testing. Typically, the metrics used to determine the performance of this software is heavily reliant on the platform and the state of the environment in which the application server and database run, which may include factors such as the hardware the application server and database are running on, other processes simultaneously on the same hardware, the client system accessing the database, and the combination of tasks being performed on the application server and database, for example. The dependence of the state of the environment and platform has made it difficult to get reliable performance data on software running over a variety of hardware platforms. Along with traditional performance metrics, a variety of additional metrics are collected on the running software, that are not used to derive performance data.

BRIEF SUMMARY

In accordance with embodiments, there are provided mechanisms and methods for automated performance testing in a multi-tenant environment. These mechanisms and methods for automated performance testing in a multi-tenant environment can enable embodiments to provide the capability to test and collect metrics regarding software performance that are not dependant on the hardware the software is running on.

In an embodiment, a list of changes (which may be referred to as a change list) to be made to a software application is submitted to an automated testing system. In an embodiment, the system for automated performance testing in a multi-tenant environment is located on an application server, but in other embodiments could be located on a variety of other locations. The automated testing system takes the change list, rebuilds the software environment incorporating those changes and then executes the software. Environment-independent metrics on the performance of the software are then collected and stored to memory. These metrics are used to observe trends and detect any degradation of performance. Based on the evaluation of the metrics, a decision is made whether to issue and alert or take corrective action.

While one or more implementations and techniques are described with reference to an embodiment in which method and system for automated performance testing in a multi-tenant environment is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for automated performance testing in a multi-tenant environment.

As used herein, the term multi-tenant database system refers to those systems in which various elements of hardware and software of the database system may be shared by one or more customers. In an embodiment, any given tenant may be an organization, which may include multiple users, which may be employees and/or clients of the tenant, for example. For example, a given application server may simultaneously process requests for a great number of customers, and a given database table may store rows for a potentially much greater number of customers. As used herein, the term query plan refers to a set of steps used to access information in a database system.

Next, mechanisms and methods for providing automated performance testing in a multi-tenant environment will be described with reference to example embodiments.

The following detailed description will first describe the automated testing environment in accordance with aspects and embodiments.

System Overview

Figure 1:
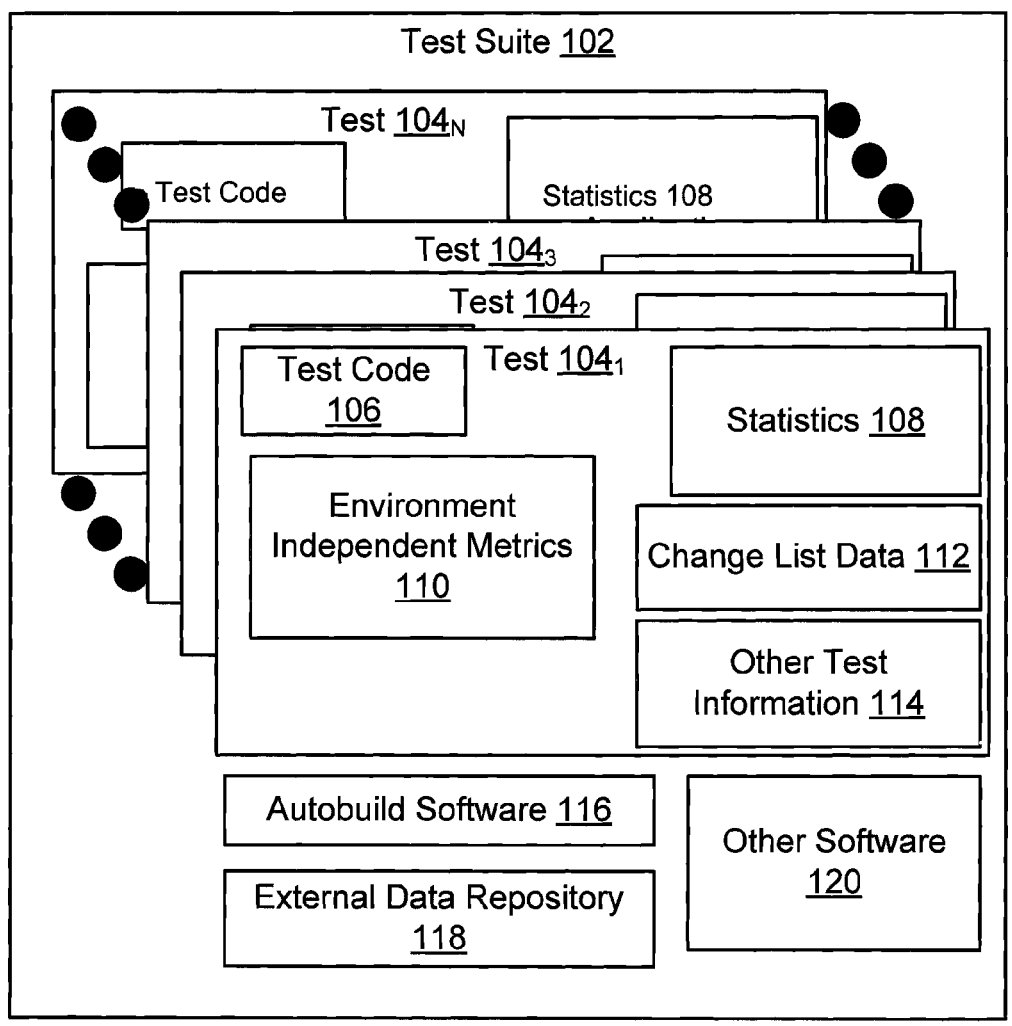
FIG. 1 illustrates an embodiment of a method and system for automated performance testing in a multi-tenant environment.

FIG. 1 illustrates an embodiment of a system 100 for automated performance testing in a multi-tenant environment. System 100 may include test suite 102, tests $104_1$-$104_N$, test code 106, statistics 108, environment independent metrics 110, change list data 112, other test data 114, autobuild software 116, external data repository 118, other software 120. In other embodiments, system 100 may not have all of the components listed and/or may have other elements instead of, or in addition to, those listed above.

In an embodiment, system 100 is a multi-tenant on demand database on which the performance monitoring test suite runs, which may include a system including a system of one or more computers, servers, and/or a database. Other details of system 100 that are independent of the performance monitoring suite is discussed further in FIGS. 4 and 5. For example, system 100 may be included in an application server, a debugging server or any networked computing device. Test suite 102 may be the software that runs multiple programs associated with automated performance testing. In an embodiment, test suite 102 may used to evaluate code and determine the performance of the code independently of the hardware on which the software is running. Test suite 102 may include a compilation of various programs that allow the tester to see the performance of code running on a server. The code may need to run on a multiplicity of servers in a collection of clusters of servers. By using environment independent metrics, the test results on in one environment may be equally valid on another environment.

Tests $104_1$-$104_N$ are specific automated performance testing sessions evaluating at least one piece of code. In this specification, the terms code and software are used interchangeably. In an embodiment, in each test instance 104 the data derived from the test is displayed on screen during testing to be reviewed by a programmer. In other embodiments, this information may not be displayed on screen but must be accessed by the programmer. In an embodiment, test suite 102 can run any number of test instances 104 at a time. In an embodiment, external data repository saves the results of a test instance 104 to memory. In an embodiment the memory where the information is being stored is on a local machine, but in other embodiments, the memory may be located over a network in a remote location.

Test code 106 is the code being tested during each test instance, such as tests $104_1$-$104_N$. Statistics 108 is a collection of statistics related to the performance of the code being tested in each test instance. Environment independent metrics 110 are the standards by which the performance of the code being tested may be evaluated, but which are independent of environment, such as the amount of memory used and/or the number of times a particular routine is called.

Environment independent metrics 110 is a set of metrics by which the performance of a given computing code can be evaluated. Test suite 102 uses a set of environment independent metrics 110 to evaluate the performance of a given code set. Test suite 102 relies on environment independent metrics 110 rather and than traditional metrics, which change depending on the platform being tested, in order get a set of measures of the performance that are expected to be are the same on a wide set platform configurations rather than a single or narrow set of platform configurations. Using environment independent metrics allows programmers to remove a greater number of hardware and environmental variables from the testing process, making performance measures more consistent, as well as removing the need for extensive re-testing on a wide range of hardware and software platforms. Using environmental independent metrics is helpful, because a code can perform very differently in different environments. For instance, central processing units can have a variety of architectures which are better suited to handle different tasks or operation at different speeds. Code is often written to take advantage of the particular strengths of a given processor type, and may not perform as well on another processor. By collecting metrics that do not rely on the hardware configuration, such as processor speed, which changes depending on the processor used, a wide range of variables can be removed from the testing process. In an embodiment, test suite 102 along with the environment independent metrics 110 are stored on an application server or de-bugging server. In other embodiments, test 102 may run from one memory location while the metrics being collected are stored on another machine and accessed remotely by test suite 102. In other embodiments, both test suite 102 and environment independent metrics 110 may be stored and run on any computation device.

Change list data 112 is the data related to the changes made to the code being tested. Change list data 112 may include the change list. In an embodiment, the change list of change list data 112 may be created by a programmer, but in other embodiments may be generated from an automated list of changes.

Other test data 114 may include any other information that programmers may desire to include in the information about the test. Autobuild software 116 is the software which collects the change list, rebuilds the environment and executes the software including the changes in the change list, creating the application being tested. External data repository 118 is the location where the results from test instances may be stored. Other software 120 may be any other code that may be included within the test suite to evaluate application performance, such as conventional performance test that rely on environment dependent metrics.

Figure 2:
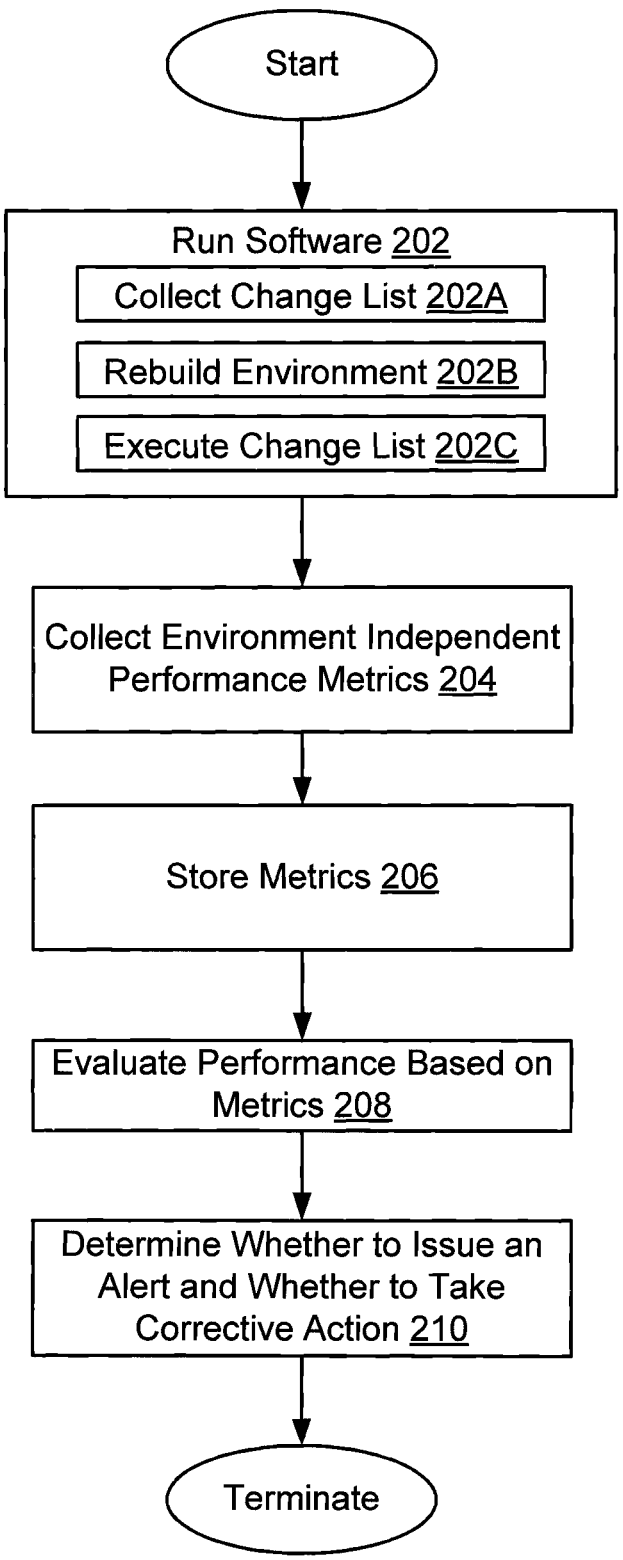
FIG. 2A is an operational flow diagram illustrating an embodiment of a method for automated performance testing in a multi-tenant environment.

FIG. 2 illustrates an operational flow diagram which is an embodiment of a method for automated performance testing in a multi-tenant environment in an embodiment. In step 202, test suite 102 is invoked.

As a simplified example, the code prior to being revised might be

```
1 InvokeDatabase{column_name, table_name}
2 {
3   Statement='SELECT column_name FROM table_name'
4   JDBC.CreateConnection(Database, Statement);
5 }
```

The change list might include lines of code that are intended to be substituted for current lines of code. For example, the change list may include the following line of code, which is intended to replace the first line of the above example.

InvokeDatabase{column_name, table_name, operator, value}.

The change list may also include a line of code that is to be added to the above example, such as WHERE column_name operator value.

Step 202 may include several substeps, such as steps 202A-C. In step 202A, autobuild software 116 retrieves a list of changes to be made to the server code, which may be taken from change list data 112.

In step 202B autobuild software 116 automatically builds the code except with the changes of the change list in preparation for executing the change list. In an embodiment, the code that is built is test code 106. For example, continuing with the example above, as a result of the autobuild, the resulting code after being rebuilt may be

```
1 InvokeDatabase{column_name, table_name}
2 {
3   Statement='SELECT column_name FROM table_name
4   WHERE column_name operator value';
5   JDBC.CreateConnection(Database, Statement);
6 }
```

In step 202C, the rebuilt code including the change list is executed.

In step 204, environment independent metrics 110 are collected on the running code. In an embodiment, these metrics are based on performance aspects that are independent of the hardware the and/or the state of the environment of the system in which the code is running In step 206, the performance metrics are stored to memory. In an embodiment, the memory (where the performance metrics is stored) is located locally on the server, in alternate embodiments the memory can be located on memory connected the server via network connection. In step 208, performance is evaluated based entirely or in-part on the performance metrics. Performance can be derived from the metrics by observing factors, such as metrics associated with memory cache access, performance degradation can be observed if the code uses the cache inefficiently. In an embodiment, the performance evaluation may be done by automated software. In another embodiment, the evaluation can be done manually by a programmer. In step 210, a determination may be made whether to issue an alert or whether to take corrective measures. In an embodiment, the automated software running the environment independent metrics 110 may include parameters, which, once met, sends an alert regarding performance. In an embodiment, the decision to take corrective measure could either be made by a programmer responding to a performance alert or, in other embodiments, by the evaluation software, possessing a list of predetermined corrective measures corresponding to various performance issues.

Figure 3:
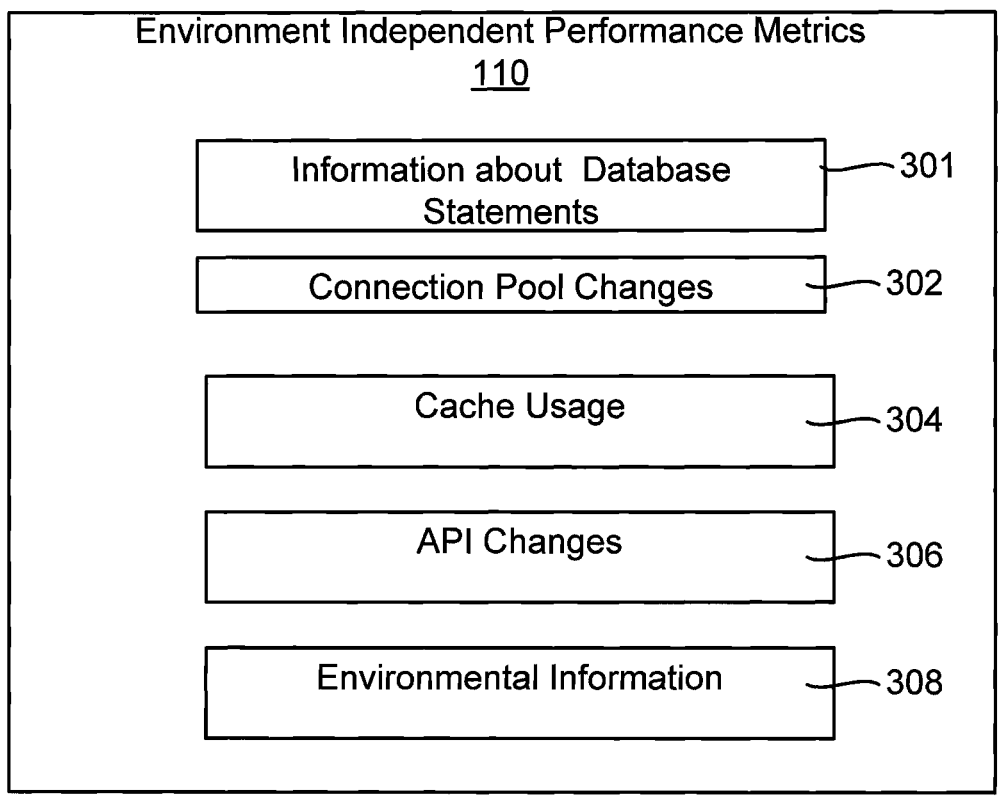
FIG. 3 is an embodiment of database fields and relationships supporting techniques for a method and system for automated performance testing in a multi-tenant environment.

FIG. 3 shows a block diagram of an embodiment of environment independent metrics 110 that may be used for automated performance testing in a multi-tenant environment. Environment independent metrics 110 may include database statements information 301, connection pool changes 302, cache usage 304, API information 306, and environmental information 308. In other embodiments, environment independent metrics 110 may have other elements instead of, or in addition to, those listed above.

Database statements information 301 includes information about database statements, such as a count of database statements executed, a count of types of database statements, and/or other measures of the actions taken in the databases accessed. If a particular type of database statement occurs often, it may be desirable to create an accelerator to reduce the amount of computations necessary to implement that database statement. Also, if a particular type of database statement is executed more often than makes sense, there may be bug that is causing the excessive number of executions of that type of database statement. For example, the database statements information may include

| Database Statement | Location (line #) | Number of times called |
|---|---|---|
| insert | 243 | 100 times |
| update | 147 | 150 times |
| insert | 5248 | 9 times |
| update | 14 | 150 times |
| update | 1071 | 150 times |
| delete | 2080 | 1 times. |

Additionally or alternatively, the user may be presented with a table showing usage of the database, such as

| Table Name | Inserts | Updates | Deletes |
|---|---|---|---|
| TABLE1 | 224 | 3 | 121 |
| TABLE2 | 153 | 1 | 213 |
| TABLE3 | 341 | 2 | 146 |
| TABLE4 | 432 | 8 | 157 |
| TABLE5 | 22 | 5 | 10 |
| TABLE6 | 12 | 6 | 19 |
| TABLE7 | 2 | 0 | 20 |
| TABLE8 | 5 | 2 | 1 |
| TABLE9 | 15 | 3 | 3 |
| TABLE10 | 16 | 1 | 4 |

In the above table, TABLE 1, TABLE 2, etc. are names of databases, and the inserts and deletes may be insertions and deletions of records, and the updates may be updates of the values in existing records.

Connection pool changes 302 may include information about changes to a connection pool. The connection pool may include a pool of database connections that are stored in cache, which may enhance the performance of the database statements by providing faster access to the databases than establishing the connection anew. Connection pool changes 302 may include information about the number and types of connections that a piece of code makes to one or more databases. In an embodiment, connection pool changes 302 refers to a set of metrics that measures the connections a code makes to databases. By measuring the changes to the connection pools and the actions made in databases information about the performance of a code can be determined. For example, the number of connection pool changes is an indication of how efficiently the code can access different databases. In an actual connection pool may be capable of storing several many connections. However, for purposes of a simple example, assume we have a connection pool that can only store connections to 4 tables, and assume that we have 10 tables. Then a sampling of the connection pool, may yield

| Name | Connection String |
|---|---|
| ConnectDB1 | jdbc:msql://www.salesforce.com:1114/connect_request_mgr:0x0084FF26 |
| ConnectDB2 | jdbc:msql://www.salesforce.com:1114/connect_request_mgr:0x00000897 |
| ConnectDB3 | jdbc:msql://www.salesforce.com:6137/connect_request_mgr:0x1AC73F02 |
| ConnectDB4 | jdbc:msql://www.salesforce.com:0501/connect_request_mgr:00FCCD9F43 |

In the above, there are two columns. The first column is the name of the connections string and the second column is the actual connection string. In the connection string, numbers 1114, 6137, and 0501 are the ports representing the location that is being connected to, and the numbers 0x0084FF26, 0x00000897, 0x1 AC73F02, and 0x00FCCD9F43 are the memory locations in cache where the connection is stored. The connections stored in the pool may be sampled periodically, and as the connection stored in the pool change, the contents captured as part of the sample of the connection pool changes. In an embodiment, connection pool changes may be automatically derived from multiple samplings of the connection pool. Alternatively a log may be kept of the connection pool changes. In an embodiment, each entry into the log may include a list of the connections added and removed from the connection pool between two samplings of the connection pool. By comparing reviewing the changes to the connection pool, the user may be able to derive information about how the connection pool is being used, whether enough cache is allocated to the connection pool, whether too much caches is allocated to the connection, pool and/or whether certain information should be stored in different databases to reduce the number of connection pool changes.

Cache usage 304 is a set of measures related to how a code uses cache memory, such as how much cache is used. In an embodiment, cache usage 304 refers to a set of metrics that indicate of how a code uses cache memory. The usage is measured in gets, puts, hit ratios, distributed cache, etc. Cache memory is extremely fast memory built into processing chips. This type of memory is used to store instructions or information that is repeatedly required to run code. In an embodiment, a get is when something is accessed in cache memory. In an embodiment, a put is when something is stored in cache memory. In an embodiment, a hit ratio is rate at which accesses to cache memory results in the use of information. In an embodiment, distributed cache is when cache memory is distributed among several servers. These measures are a good indicator in performance in that a set of code that efficiently uses cache memory run more quickly. For example, if after executing a change list on a given set of code the hit ratio went down, that would indicate that the new set of code is not finding the information it needs in cache and as a result will run slower as accessing information in main memory is slower than cache memory.

As an example, assume that there is also other code in addition to the above code that include the variables record_ID, User_itnerface_tag, password, user_name, sales, and profits. The cache usage that may be presented to a user may include

| Cache address | Name | Bits | Type | Hit Ratio |
|---|---|---|---|---|
| 0x0094EF25, | connectTABLE1 | 128 | Connection | .85 |
| 0x00300867, | connectTABLE2 | 128 | Connection | .91 |
| 0x13C7HFA, | connectTABLE3 | 128 | Connection | .94 |
| 0x9C4D3F4 | connectTABLE4 | 128 | Connection | .87 |

-continued

| Cache address | Name | Bits | Type | Hit Ratio |
|---|---|---|---|---|
| 0x456AGH5 | column_name | 128 | String variable | .88 |
| 0x0BH98766 | table_name | 128 | String variable | .89 |
| 0x56AHG48 | database | 128 | String variable | .62 |
| 0x456AGH4 | statement | 128 | String variable | .56 |
| 0x456AGH4 | record_ID | 128 | Get | .63 |
| 0x456AGH4 | User_interface_tag | 128 | Get | .96 |
| 0x456AGH4 | Password | 128 | Put | .75 |
| 0x456AGH4 | User_name | 128 | Put | .67 |
| Not in Cache Now | sales. | 128 | Integer variable | .45 |
| Not in Cache Now | profits. | 128 | Fixed point variable | .76 |
| Total Cache Bytes In Use 1152 | | | | |
| Number of Gets 2 | | | | |
| Number of Puts 2 | | | | |
| Overall hit ratio 45% | | | | |

API changes 306 may include a set of measures, such as a count, of inserts, updates, and deletes performed by a code, which may be changes to a code, such as user provided code or other code that runs on the server. The inserts, updates, and deletes may include inserting, updating, and deleting parameters associated with an API and/or a user changing a selection of which service is being used. For example, there may be different types of services for creating documents and the user may switch the service that creates the document. Also, some functions of the API may be capable of accepting a variable number of input parameters and the same function may be called with a different set and number of parameters. Optionally, in an alternative embodiment, inserts, updates, and deletes may also include inserting and deleting fields from the API, and changing the name and/or type of a field of the API. Environment information 308 may include information about the platform the code is being run on, such as the operating system, the processor, a list of other programs that are running, the number of users accessing the system at the time of the test. In an embodiment, environment information 308 collects a set of measures that give information on the environment the tested code is being run in. In an embodiment, environment information 308 could include the hardware being used, software being used for the test suite, the architecture of the databases being accessed, and/or any other pertinent data which programmers might need regarding the testing environment.

An example of the environment information may include
Server: Sparc T3-1
Cores 16
Threads 128
Operating system: Unix,
Webserver: Apache HTTP server
Other Software
Java Virtual Machine Database Statistics Example Before revision, a database table may have statistics that indicate to a query optimizer that a hash join will be an efficient way to join two tables. However, after a code revision, the hash join becomes inefficient, and the statistics need to be updated. The system detects this by measuring before and after metrics including buffer gets, execs, buffer cache hit ratio, etc. In this example, buffer gets would dramatically increase after revision, triggering the system to notify the developer that the developer needs to revise the table statistics or the SQL statement.

Caching Example

Before a revision of a particular object, a given piece of code has the following logic:
1) Check the local cache to see if the object is in cache. If the object is in cache, return the object.
2) Check the remote cache to see if the object is in the remote cache. If the object is in the remote cache, insert the object into local cache and return the object.
3) Query the database for the object, insert the object into the remote and local cache, and return the object.

A developer may modify the logic to make the above logic simpler. For example, a simpler variation of the above logic is as follows.
1) Check the local cache to see if a particular object is in cache. If the object is in cache, return the object (as in step 1 above).
2) Check the remote cache to see if the object is in the remote cache. If the object is in the remote cache, insert the object into local cache and return the object (as in step 2 above).
3) Query the database for the object, and return the object (which is similar to step 3 above, but differs from step 3 above in that in the simpler step 3 the object found while querying is not inserted into the remote and local cache).

However, the simpler logic is flawed, in that multiple requests for the same object may all arrive at the remote cache simultaneously or within a short duration of time, and it may be that only the first request was serviced by the remote cache before this change.

Test suite 102 and/or method 200 can detect this condition, because test suite 102 and/or method 200 monitors how many requests are made to the remote cache for each application transaction. When this number (the number of requests are made to the remote cache for each application transaction) increases dramatically, a developer will be notified that the performance has regressed, and a bug will be filed to fix the new code.

Memory Allocation Example

Before revision, a piece of code may have the following flow (as represented by the following pseudo-code):

```
public String createStringFromCalculatedValues( ) {
    StringBuffer buffer = new StringBuffer( )
    while (someCondition) {
        buffer.append(calculatedValue( ))
    }
    return buffer.toString( )
}
```

A naive developer may modify the above code to read like as follows, thinking that the code has been improved by avoiding a StringBuffer call:

```
public String createStringFromCalculatedValues( ) {
    String buffer = new String( )
    while (someCondition) {
        buffer = calculatedValue( )
    }
    return buffer;
}
```

However, what may not be obvious to the naïve developer from the simpler code is the fact that many more String allocations will occur as a result of the revision. Test suite 102 and/or method 200 may track memory allocations and report that the memory allocations have increased dramatically, allowing a potential performance problem to be identified early in the development process.

Figure 4:
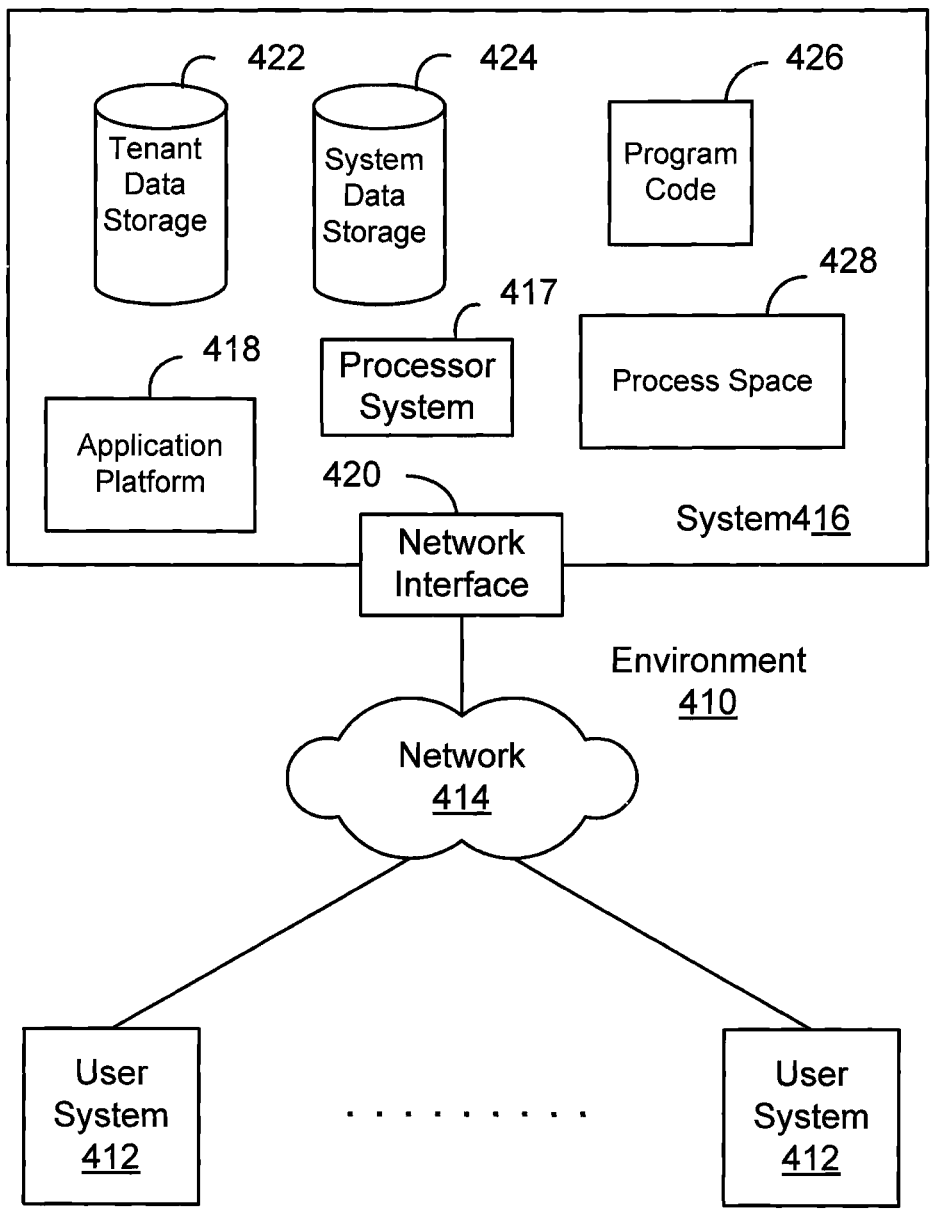
FIG. 4 illustrates a block diagram of an example of an environment wherein an on-demand database service might be used.
Figure 5:
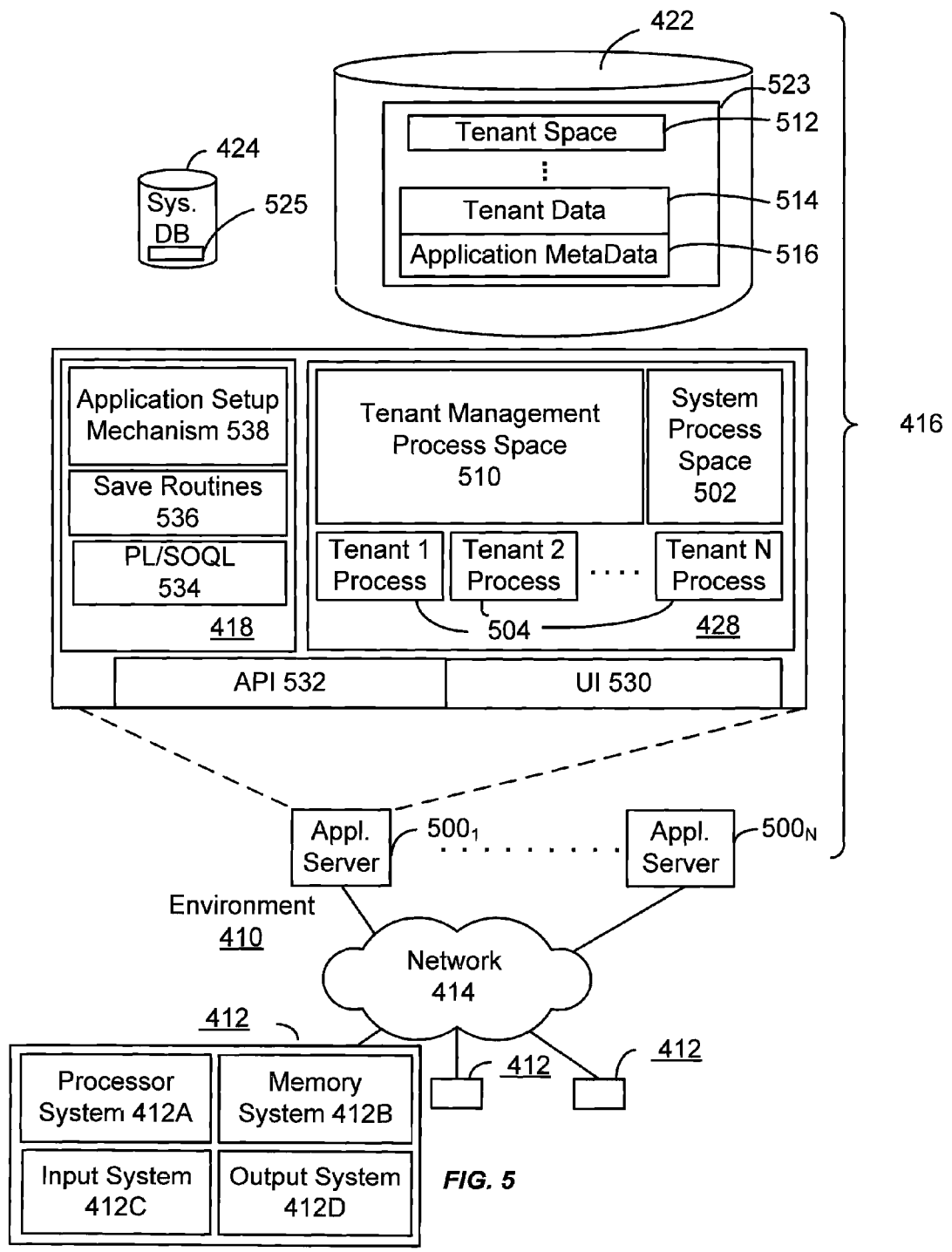
FIG. 5 illustrates a block diagram of an embodiment of elements of FIG. 4 and various possible interconnections between these elements.

FIG. 4 illustrates a block diagram of an environment 410 wherein an on-demand database service might be used. Environment 10 may include user systems 412, network 414, system 416, processor system 417, application platform 18, network interface 420, tenant data storage 422, system data storage 424, program code 426, and process space 428. In other embodiments, environment 10 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 7) user systems 412 might interact via a network 414 with an on-demand database service, which is system 416. System 100 may be included in and/or an embodiment of system 16.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 16 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application (s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
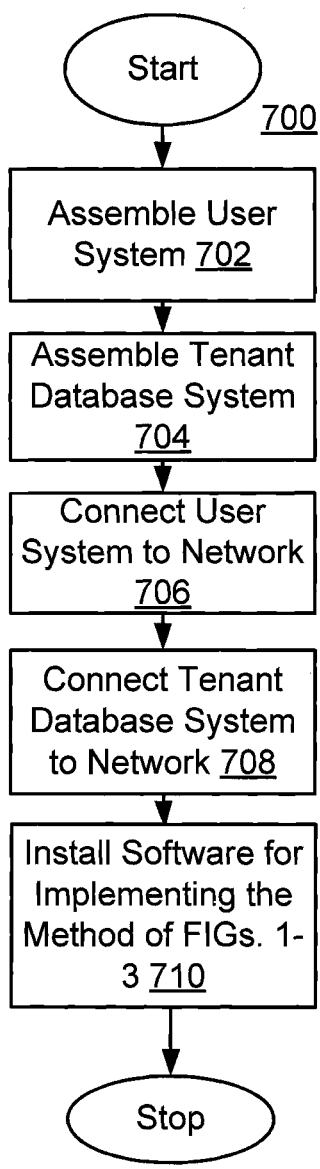
FIG. 7 illustrates a flowchart of an embodiment of a method of making environment of FIGS. 4 and 5.

FIG. 7 also illustrates environment 410. However, in FIG. 7 elements of system 416 and various interconnections in an embodiment are further illustrated. FIG. 7 shows that user system 412 may include processor system 412A, memory system 412B, input system 412C, and output system 412D. FIG. 7 shows network 414 and system 416. FIG. 7 also shows that system 416 may include tenant data storage 422, tenant data 423, system data storage 424, system data 425, User Interface (UI) 730, Application Program Interface (API) 732, PL/SOQL 734, save routines 736, application setup mechanism 738, applications servers $1000_1$-$1000_N$, system process space 702, tenant process spaces 704, tenant management process space 710, tenant storage area 712, user storage 714, and application metadata 716. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 7, system 416 may include a network interface 420 (of FIG. 4) implemented as a set of HTTP application servers 700, an application platform 418, tenant data storage 422, and system data storage 424. Also shown is system process space 702, including individual tenant process spaces 704 and a tenant management process space 710. Each application server 1000 may be configured to tenant data storage 422 and the tenant data 423 therein, and system data storage 424 and the system data 425 therein to serve requests of user systems 412. The tenant data 423 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 416 resident processes to users and/or developers at user systems 412. The tenant data and the system data may be stored in various databases, such as one or more Oracle™ databases.

Application platform 418 includes an application setup mechanism 738 that supports application developers' creation and management of applications, which may be saved as metadata into tenant data storage 422 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 425 and tenant data 423, via a different network connection. For example, one application server $700_1$ might be coupled via the network 414 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 412 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 700 to request and update system-level and tenant-level data from system 416 that may require sending one or more queries to tenant data storage 422 and/or system data storage 424. System 416 (e.g., an application server 700 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 1 and 2)

Figure 6:
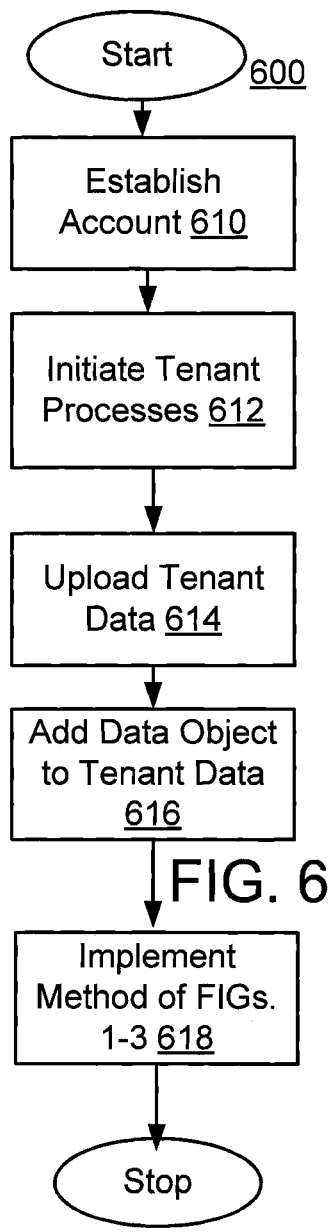
FIG. 6 illustrates a flowchart of an example of a method of using environment FIGS. 4 and 5.

FIG. 6 shows a flowchart of an example of a method 600 of using environment 10. In step 610, user system 12 (FIGS. 1 and 2) establishes an account. In step 612, one or more tenant process space 104 (FIG. 2) are initiated on behalf of user system 12, which may also involve setting aside space in tenant space 112 (FIG. 2) and tenant data 114 (FIG. 2) for user system 12. Step 612 may also involve modifying application metadata to accommodate user system 12. In step 614, user system 12 uploads data. In step 616, one or more data objects are added to tenant data 114 where the data uploaded is stored. In step 618, the method for query optimization in a database network system may be implemented. In another embodiment, although depicted as distinct steps in FIG. 6, steps 602-618 may not be distinct steps. In other embodiments, method 600 may not have all of the above steps and/or may have other steps in addition to, or instead of, those listed above. The steps of method 600 may be performed in another order. Subsets of the steps listed above as part of method 600 may be used to form their own method.

Method for Creating the Environment (FIGS. 1 and 2)

FIG. 7 is a method of making environment 10, in step 702, user system 12 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 704, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers $100_1$-$100_N$, system process space 102, tenant process spaces 104, tenant management process space 110, tenant space 112, tenant data 114, and application metadata 116 (FIG. 2).

In step 706, user system 12 is communicatively coupled to network 104. In step 708, system 16 is communicatively coupled to network 104 allowing user system 12 and system 16 to communicate with one another (FIG. 2). In step 710, one or more instructions may be installed in system 16 (e.g., the instructions may be installed on one or more machine readable media, such as computer readable media, therein) and/or system 16 is otherwise configured for performing the steps of methods for query optimization in a database network system. For example, as part of step 710, one or more instructions may be entered into the memory of system 16 for query optimization in a database network system.

In another embodiment, although depicted as distinct steps in FIG. 7, steps 702-710 may not be distinct steps. In other embodiments, method 700 may not have all of the above steps and/or may have other steps in addition to, or instead of, those listed above. The steps of method 700 may be performed in another order. Subsets of the steps listed above as part of method 700 may be used to form their own method.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for automated performance testing in a multi-tenant environment in a multi-tenant database system, the method comprising:
revising code, stored on one or more non-transitory computer readable media associated with a host system having a processor system including one or more processors, the revising of the code being performed by the host system based on a list of changes to make to the code;
within an environment associated with the host system, by the processor system, invoking the code after the revising of the code therein causing the code to run on the host system within the environment;
collecting information indicative of performance of the code, the information being based on performance metrics that are independent of the environment; and
storing the performance metrics for later retrieval and analysis,
wherein the collecting of the information indicative of the performance of the code including at least collecting information related to memory usage,
the information related to memory usage includes at least information about requests placed for retrieving information from a set of physical memory locations, information about requests placed for retrieving information from a set of physical memory locations, information about requests placed for adding information to a set of physical memory locations, and information about memory usage of a memory location set aside for an application exchange.

2. The method of claim 1, the revising of the code including at least:
retrieving the list of code changes;
altering the code to incorporate the changes of the list of changes; and
compiling the code that was altered.

3. The method of claim 1, the collecting of the information indicative of the performance of the code including at least collecting information related to a pool of database connections stored in cache.

4. The method of claim 1, the collecting of the information indicative of the performance of the code including at least collecting information related to the type of database statements executed.

5. The method of claim 1, wherein the performance metrics includes at least information about inserts of functions to an application Programming Interface associated with the code.

6. The method of claim 1, wherein the performance metrics includes at least information about deletes of functions to an application Programming Interface associated with the code.

7. The method of claim 1, wherein the performance metrics includes at least information about updates of functions to an application Programming Interface associated with the code.

8. The method of claim 1, wherein the performance testing framework includes collects environmental information.

9. A non-transitory machine-readable medium carrying one or more sequences of instructions for automated performance testing in a multi-tenant environment in a multi-tenant database system, which instructions, when executed by one or more processors, cause the one or more processors to carry out a method comprising:
running a performance testing framework on an autobuild environment that rebuilds the application after each submitted change list;
generating performance metrics by running performance tests on a rebuilt application that are independent of the autobuild environment; and
storing the performance metrics for later retrieval and comparison
wherein the generating of the performance metrics includes generating information indicative of the performance of the application including at least collecting information related to memory usage,
the information related to memory usage includes at least information about requests placed for retrieving information from a set of physical memory locations, information about requests placed for retrieving information from a set of physical memory locations, information about requests placed for adding information to a set of physical memory locations, and information about memory usage of a memory location set aside for an application exchange.

10. The non-transitory machine-readable medium as recited in claim 9, the method further comprising:
retrieving a change list for the application, automatically incorporating changes derived from the change list into the application, and automatically compiling the application with the changes in specified in the change list incorporated in the application.

11. The non-transitory machine-readable medium as recited in claim 9, the metrics being platform independent.

12. An apparatus for automated performance testing in a multi-tenant environment in a multi-tenant database, the apparatus comprising:
- a processor; and
- one or more stored sequences of instructions which, when executed by the processor, cause the processor to carry out a method comprising:
    - running a performance testing framework on an autobuild environment that rebuilds the application after each submitted change list;
    - generating performance metrics by running performance tests against the rebuilt application that are independent of the autobuild environment; and
    - storing the performance metrics for later retrieval and comparison,
- wherein the generating of the performance metrics includes generating information indicative of the performance of the application including at least collecting information related to memory usage,
- the information related to memory usage includes at least information about requests placed for retrieving information from a set of physical memory locations, information about requests placed for retrieving information from a set of physical memory locations, information about requests placed for adding information to a set of physical memory locations, and information about memory usage of a memory location set aside for an application exchange.

* * * * *